Nov. 25, 1958  H. B. VINCENT  2,861,392
APPARATUS FOR SEALING PICTURE TUBES
Filed March 20, 1956  3 Sheets-Sheet 1

INVENTOR
HARVARD B. VINCENT
BY
Rule and Hoge,
ATTORNEYS

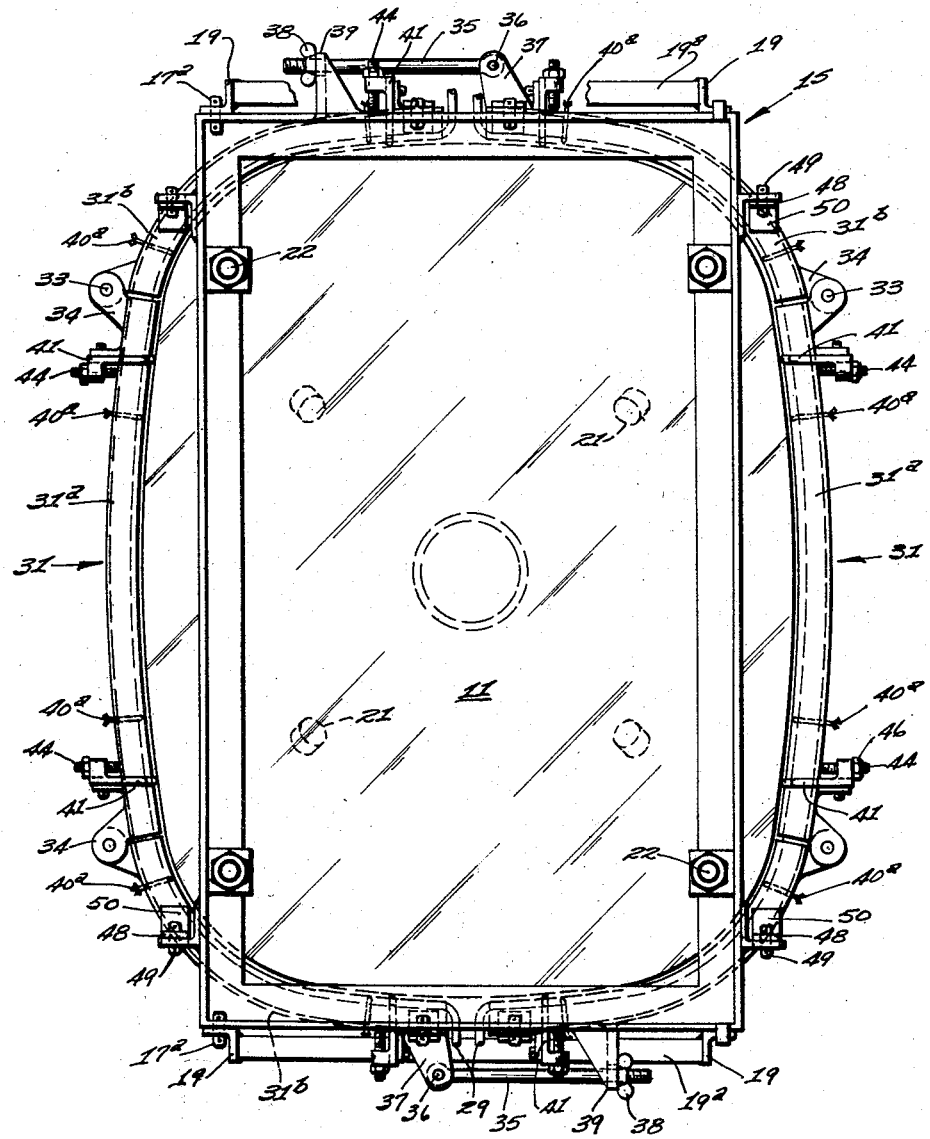

Nov. 25, 1958 H. B. VINCENT 2,861,392
APPARATUS FOR SEALING PICTURE TUBES
Filed March 20, 1956 3 Sheets-Sheet 3
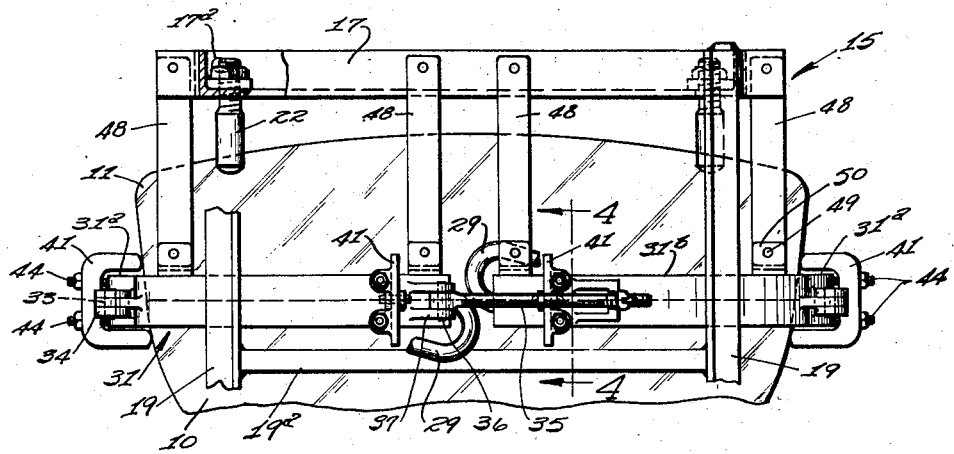
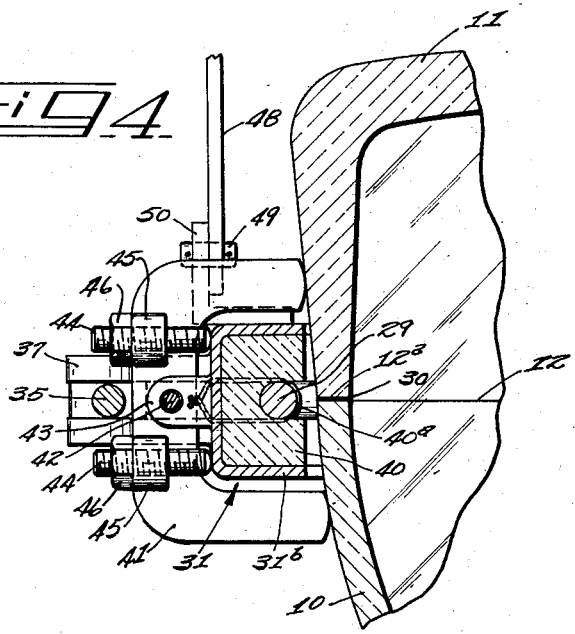
INVENTOR
HARVARD B. VINCENT
BY
ATTORNEYS United States Patent Office 2,861,392
Patented Nov. 25, 1958

2,861,392
APPARATUS FOR SEALING PICTURE TUBES
Harvard B. Vincent, Toledo, Ohio, assignor to Owens-Illinois Glass Company, a corporation of Ohio
Application March 20, 1956, Serial No. 572,669
5 Claims. (Cl. 49—1)

My invention relates to apparatus for sealing glass parts together. The invention is of utility for sealing together the bodies and face plates of glass envelopes for television picture tubes and is herein illustrated and described as used for such purpose although not limited to this particular use.

Apparatus for practicing the invention as herein illustrated comprises a carriage in which a picture tube is mounted with the face plate over and in register with the funnel or body of the tube. Electric heating means includes electric resistors mounted within a supporting frame on the carriage and clamped to the picture tube with the heating element surrounding the tube at the meeting plane of the glass parts. The carriage with the picture tube therein is placed within the heating or baking oven which may be in the form of a circular or endless tunnel through which the tubes are carried during the baking process and within which the tubes are exhausted and sealed.

Referring to the accompanying drawings:

Fig. 2 is a plan view of the carriage with the picture tube mounted therein;

Fig. 3 is an end elevation of the carriage and picture tube with parts broken away; and Fig. 4 is a section on a comparatively large scale at the line 4—4 on Fig. 3.

Figure 1:
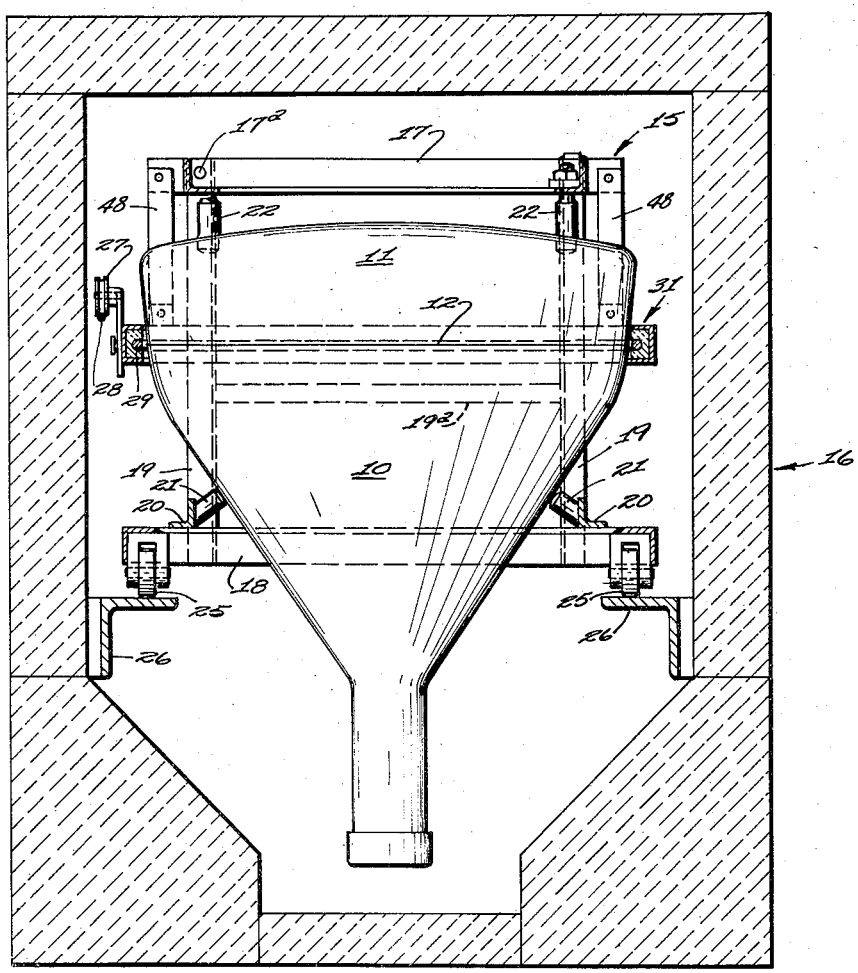
Fig. 1 is an elevational view of a picture tube mounted in a carriage within a tunnel, the latter shown in cross section.

As shown in the drawings the picture tube comprises a funnel shaped body 10, usually referred to as the funnel, and a face plate 11 which is sealed to the funnel 10. The meeting surfaces of the parts are in a horizontal plane at the line 12. The picture tube is mounted in a framework or carriage 15 by which it is carried within a baking oven or tunnel 16. The oven may be heated by electrical resistors or heating elements.

The carriage 15 includes upper and lower rectangular frame members 17 and 18 respectively which may be made of angle iron bars. These frame members are vertically spaced apart by a frame structure including vertical angle bars 19 and cross bars 19a. The lower frame member 18 includes longitudinal angle bars 20 to which are attached supporting lugs 21 in position to engage and hold the funnel or body 10. The face plate 11 is of elongated form, approximately rectangular and rounded at the corners. The funnel 10 is of this same shape at its upper surface, the side walls being downwardly convergent with the lower portion of the tube circular in cross section. Thus, as shown in Fig. 2 the supporting lugs 21 are arranged in a circle to contact the funnel which is circular at the plane of contact. The face plate 11 is held in position in alignment with the body 10 by locating lugs or posts 22 attached to and extending downward from the upper frame member 17 which is hinged to swing upward about pivot pins 17a. The posts 22 are screw threaded for lengthwise adjustment in the frame member 17. Rollers 25 journalled in the lower frame member 18 run on tracks 26 mounted in the tunnel 16. A trolley 27 on the carriage runs on a wire 28 by which electric current is conducted to the heating elements.

A coating 30 of the brazing material is applied to one of the surfaces to be welded together, in any approved manner as, for example, that disclosed in the pending application of Robert D. Colchagoff, Serial No. 530,329, filed August 24, 1955, now Patent No. 2,822,777, Apparatus for Applying Sealing Compositions to Glass Parts.

Means for locally heating the parts of the picture tube along their meeting surfaces in the plane 12, includes electric heating elements 29 which may be Calrods or other suitable electrical resistance elements. These, as shown, are in the form of rods or wires, circular in cross section and mounted in a supporting frame 31 which surrounds the picture tube. The frame 31 comprises side frame members 31a which extend along the sides of the picture tube and end frame members 31b which extend around the corners and ends of the picture tube. The frame members 31a and 31b are hinged together by pivot pins 33 permitting the frame and heating elements to be assembled and positioned around the picture tube. The pivot pins are mounted in lugs 34 on the frame. Means for clamping the frame 31 and heating elements together includes clamping rods 35 pivoted at 36 to lugs 37 on the frame members 31b. Each rod 35 has a threaded end portion to receive a wing nut 38 engaging a lug 39 for clamping the frame 31 in position.

The frame members 31a, 31b are channel shaped in cross section (Fig. 4), the channel being filled with a suitable insulating material 40 within which the resistance elements are partly imbedded and by which said elements are held in position in close proximity to the marginal meeting surfaces 12a at the plane 12. The insulation 40 is held in place by wires 40a.

Means for adjusting the heating elements 29 relative to the picture tube and holding them in adjusted position, includes members 41 which are substantially U-shaped. The members 41 are connected by pivots 42 to lugs 43 formed on the channel frame members. When the frame 31 is clamped in position the ends or legs of the members 41 bear against the funnel body 10 and face plate 11 respectively. Adjusting screws 44 which are threaded through lugs 45 on the members 41, bear against the channel frame 31 and permit angular adjustment of the channel bars 31 about the pivots 42. Lock nuts 46 hold the screws in adjusted position. The frame 31 is suspended from the upper frame work of the carriage by vertical angle bars 48 which are connected by pivot pins 49 (Fig. 4) adjacent their lower ends to angle bars 50 attached to the channel frame 31.

Modifications may be resorted to within the spirit and scope of my invention as defined in the appended claims.

I claim:

1. Apparatus for use in the manufacture of a glass picture tube comprising a funnel-shaped body and a face plate having a marginal flange portion, the body and face plate having sealing surfaces meeting in a common plane with a coating of brazing material for sealing said surfaces together, said apparatus including a carriage comprising a framework for supporting the funnel body and face plate, said framework including a lower open frame member through which the funnel body extends downwardly, centering and supporting lugs on said lower frame member projecting upwardly into position to make substantially point contact with the downwardly tapered side walls of the funnel body and with said lugs distributed circumferentially of the funnel body and holding the latter in a centered position within said lower frame member, the said framework including an upper frame member and means thereon for engaging the face plate and holding it in register with the funnel body, with said sealing surfaces in register, an electrical resistance element, an annular frame in which said resistance element is mounted, means for holding said annular frame in position to surround the picture tube at said sealing surfaces with the resistance element extending along said sealing surfaces and in close proximity thereto, and means for supplying electric current to the resistance element.

2. The apparatus defined in claim 1, said annular frame being in the form of an open-sided channel within which the resistance element is mounted, the open side of the channel facing the picture tube, and insulating material substantially filling the channel and in which the resistance element is partially imbedded with the surface, said element opposite the tube exposed and closely adjacent to the outer wall surface of the picture tube along the said sealing surfaces.

3. The apparatus defined in claim 1, said annular frame including sections hinged together, permitting the frame to be closed around the picture tube, and clamping means for clamping the frame in its closed position.

4. The apparatus defined in claim 1, the means on the said upper frame member for engaging the face plate comprising lugs extending downwardly from the upper frame member and making substantially point contact with the upper surface of the face plate at a plurality of points distributed circumferentially of the face plate adjacent the outer edge thereof.

5. The apparatus defined in claim 1, including means for suspending said annular frame and comprising U-shaped supporting members contacting the funnel body and face plate respectively, said channel frame comprising sections pivotally supported in said U-shaped members for adjustment about pivots extending lengthwise of the channel sections, and adjusting means for adjusting the channel frame about said pivots.

References Cited in the file of this patent

UNITED STATES PATENTS

| | | |
|---|---|---|
| 2,111,392 | Galey | Mar. 15, 1938 |
| 2,398,525 | Gray | Apr. 16, 1946 |
| 2,512,971 | Roovers | June 27, 1950 |
| 2,517,019 | Nordberg | Aug. 1, 1950 |
| 2,656,650 | De Ano | Oct. 27, 1953 |
| 2,677,920 | Danzin | May 11, 1954 |
| 2,719,386 | Johnson | Oct. 4, 1955 |
| 2,725,678 | Weingarten | Dec. 6, 1955 |
| 2,749,668 | Chaffotte et al. | June 12, 1956 |
| 2,761,249 | Olson et al. | Sept. 4, 1956 |

FOREIGN PATENTS

| | | |
|---|---|---|
| 496,824 | Canada | Oct. 13, 1953 |